United States Patent
Ahn et al.

(10) Patent No.: US 8,343,678 B2
(45) Date of Patent: Jan. 1, 2013

(54) FUEL CELL SYSTEM TO PREHEAT FUEL CELL STACK

(75) Inventors: Gi-Jang Ahn, Yongin-si (KR); Jin-Ho Lee, Yongin-si (KR); Ki-Woon Kim, Yongin-si (KR); Seong-Jin An, Yongin-si (KR); Hyun Kim, Yongin-si (KR)

(73) Assignee: Samsung SDI Co., Ltd., Gyeonggi-Do (KR)

( * ) Notice: Subject to any disclaimer, the term of this patent is extended or adjusted under 35 U.S.C. 154(b) by 277 days.

(21) Appl. No.: 12/907,801

(22) Filed: Oct. 19, 2010

(65) Prior Publication Data
US 2011/0236777 A1    Sep. 29, 2011

(30) Foreign Application Priority Data
Mar. 26, 2010   (KR) .................. 10-2010-0027429

(51) Int. Cl.
*H01M 8/04*    (2006.01)
(52) U.S. Cl. ......... 429/443; 429/416; 429/444; 429/423
(58) Field of Classification Search .................. 429/416, 429/423, 415, 443, 444, 446
See application file for complete search history.

(56) References Cited

U.S. PATENT DOCUMENTS

| | | | |
|---|---|---|---|
| 2004/0197621 A1* | 10/2004 | Balliet et al. | 429/22 |
| 2007/0224475 A1* | 9/2007 | Terada | 429/26 |
| 2008/0081231 A1* | 4/2008 | Kurita et al. | 429/17 |
| 2009/0269631 A1 | 10/2009 | Heo et al. | |

FOREIGN PATENT DOCUMENTS

| | | |
|---|---|---|
| KR | 1020050095954 | 10/2005 |
| KR | 10-0675688 B1 | 1/2007 |
| KR | 1020070035218 | 3/2007 |
| KR | 1020070088932 | 8/2007 |
| KR | 10-0774466 B1 | 11/2007 |
| KR | 1020080027984 | 3/2008 |
| KR | 2009-0113639 A | 11/2009 |

OTHER PUBLICATIONS

KIPO Notice of Allowance (Korean only); in related Korean Application No. KR-10-2010-0027429 issued Dec. 1, 2011.

* cited by examiner

*Primary Examiner* — Raymond Alejandro
(74) *Attorney, Agent, or Firm* — Knobbe, Martens, Olson & Bear LLP

(57) ABSTRACT

A fuel cell system including: a reformer to convert a fuel into hydrogen; a reformer chamber to contain air heated by the reformer; a fuel cell stack to convert the hydrogen into electricity; a first pump to supply an oxidant to the stack; and a second pump to supply the heated air to the stack, to preheat the stack. The system may also include a controller to control the operation of the system, such that the heated air is not supplied until it reaches a predetermined temperature, and the oxidant is not supplied and the stack is not operated, until the stack reaches a predetermined temperature.

8 Claims, 2 Drawing Sheets

FUEL CELL SYSTEM TO PREHEAT FUEL CELL STACK

CROSS-REFERENCE TO RELATED APPLICATION

This application claims the benefit of Korean Application No. 10-2010-0027429, filed on Mar. 26, 2010, in the Korean Intellectual Property Office, the disclosure of which is incorporated herein, by reference.

BACKGROUND

1. Field

The present disclosure relates to a system for preheating a fuel cell stack.

2. Description of the Related Art

Fuel cells have higher efficiencies and lower emissions than internal combustion engines, so fuel cells provide a promising alternative to internal combustion engines. Various types of fuel cells have been developed, for example, household fuel cells for supplying electricity to a home, car fuel cells for electric vehicles, small fuel cells for portable electronic devices, and the like.

Fuel cells convert a fuel directly into electricity. Fuel cells include a pair of electrodes, i.e., an anode and a cathode, and an electrolyte therebetween. Some fuel cells generate electricity and heat, by oxidizing a gaseous fuel, such as hydrogen, propane, methane, or the like.

A plurality of fuel cells (unit cells) may be assembled in a stack. The unit cells may include a membrane electrode assembly (MEA) and a bipolar plate. A membrane electrode assembly includes an anode electrode (also called a fuel electrode or an oxidation electrode) and a cathode electrode (also called an air electrode or a reduction electrode), and an electrolyte therebetween.

In this configuration, hydrogen ions that have moved to the cathode through the electrolyte membrane produce an electrochemical reduction reaction with oxygen supplied to the cathode. Accordingly, electric energy, reaction heat, and water are produced.

If a fuel cell is stopped in freezing conditions, water therein may be frozen. As a result, the fuel cell may fail to start and an MEA may be damaged by the expansion of the water.

In order to prevent the above problem, there is a method of removing water from the flow channels and the MEAs of a stack, by supplying a dry inert gas thereto. However, the method has a problem, in that a large amount of the inert gas must be supplied, for a long period of time, in order to sufficiently remove the water. In particular, while it is easy to remove the water from the channels of the bipolar plates, it is very difficult to remove the water from the MEAs.

In addition, another method involves preheating a stack using a heater. However, in this case, the melting of ice causes a reduction in the performance and life span of MEAs, because of volume changes that occur during the melting.

Another method involves filling the anode of a fuel cell with a solution having a low freezing point, such as methanol. However, in this case, the performance and life span of the fuel cell is decreased, because a platinum-based catalyst therein is poisoned with CO generated as a by-product of a chemical reaction between the platinum-based catalyst and the methanol. As a result, the shelf life of the platinum-based catalyst decreases, and the methanol that is not used in the reaction with the catalyst crosses over the electrolyte membrane from the anode to the cathode, resulting in cathode flooding.

SUMMARY

The present disclosure provides a fuel cell system including a reformer and a fuel cell stack that is preheated, using heat generated by the reformer, to improve low temperature starting of the stack.

According to various embodiments, provided is a fuel cell system having improved efficiency, because heat from a reformer is used to heat air that is then supplied to a fuel cell stack, so as to preheat the stack, prior to operation.

According to various embodiments, the heated air is delivered to cathodes of the stack.

According to various embodiments, provided is a fuel cell system including: a reformer to convert a fuel into hydrogen, a fuel cell stack to convert the hydrogen into electricity; a reformer chamber to contain air heated by the reformer; a first pump to supply an oxidant to the stack; and a second pump to supply the heated air to the stack, to preheat the stack.

According to various embodiments, the heated air is supplied to the cathodes of the stack, and the system further includes a controller that controls the operations of the system, such that the first pump is not operated until the stack is preheated.

According to various embodiments, the controller stops the second pump, and operates the stack and the first pump, when the temperature of the stack reaches a predetermined temperature.

According to various embodiments, the controller operates the second pump, only after the heated air reaches a predetermined temperature.

According to various embodiments, provided is a fuel cell system including: a reformer to convert a fuel into hydrogen; a fuel cell stack to convert the hydrogen into electricity; a reformer chamber to contain air heated by the reformer; a first pipe to connect the stack to an oxidant supply; a pump disposed on the first pipe; a first valve disposed on the first pipe, upstream from the first pump, to control an amount of the oxidant supplied to the pump; a second pipe to connect the chamber to the first pipe, between the pump and the first valve; and a second valve disposed on the second pipe, to control an amount of the heated air that is supplied to the pump from the chamber.

According to various embodiments, the stack is preheated by the heated air supplied from the chamber, before the stack is operated.

According to various embodiments, the oxidant is supplied to the pump, only after the stack is preheated.

According to various embodiments, the system further includes a controller that controls the system, such that the heated air is supplied to the pump, before operating the stack, and the oxidant is supplied to the pump, after the stack is preheated.

According to various embodiments, the controller opens the second valve and operates the pump, only after the heated air in the chamber reaches a predetermined temperature.

According to various embodiments, the controller closes the first valve, when the stack is being preheated.

According to various embodiments, the controller opens the first valve and operates the stack, after the stack reaches a predetermined temperature.

Additional aspects and/or advantages of the invention will be set forth in part in the description which follows and, in part, will be obvious from the description, or may be learned by the practice of the invention.

BRIEF DESCRIPTION OF THE DRAWINGS

These and/or other aspects and advantages of the invention will become apparent and more readily appreciated from the following description of the exemplary embodiments, taken in conjunction with the accompanying drawings, of which.

DETAILED DESCRIPTION

Figure 1:
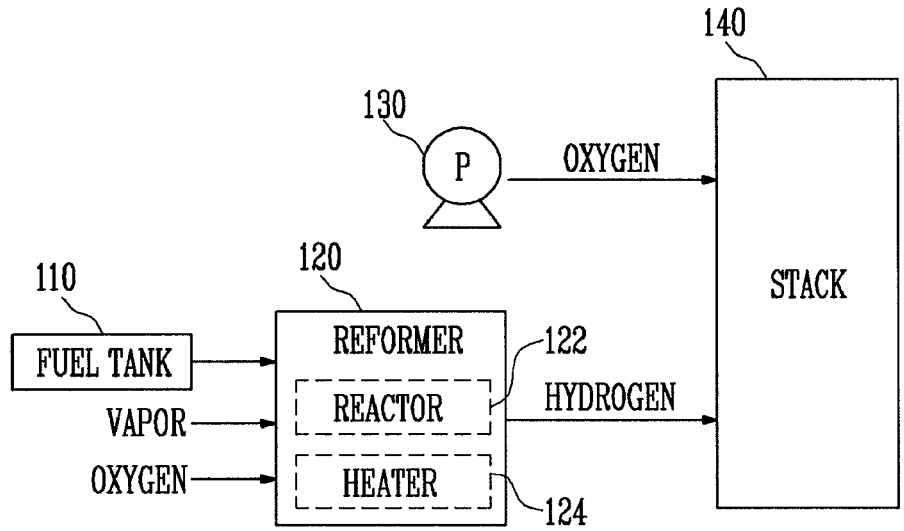
FIG. 1 illustrates a general fuel cell system.

Reference will now be made in detail to the exemplary embodiments of the present invention, examples of which are illustrated in the accompanying drawings, wherein like reference numerals refer to the like elements throughout. The exemplary embodiments are described below, in order to explain the aspects of the present invention, by referring to the figures.

FIG. 1 is a diagram illustrating a general fuel cell system. Referring to FIG. 1, the fuel cell system includes: a fuel tank 110 to store a fuel; a reformer 120 to convert the fuel into hydrogen; a fuel cell stack 140 to convert the hydrogen into electricity; and a first pump 130. The reformer 120 supplies the hydrogen to the stack 140 and the first pump 130 supplies an oxidant (oxygen) to cathodes of the stack. The fuel may be any suitable hydrogen-containing fuel, such as gasoline, propane, methane, butane, or the like.

The reformer 120 includes a reactor 122 and a heater 124. The fuel and water are supplied to the reactor 122, where the fuel is converted into hydrogen, which may be purified via a water-gas-shift reaction. An oxidant (air/oxygen) and some of the fuel are supplied to the heater 124, which heats the reactor 122 to an operating temperature. Through the above processes, the reformer 120 reaches a temperature of at least 100° C.

Figure 2:
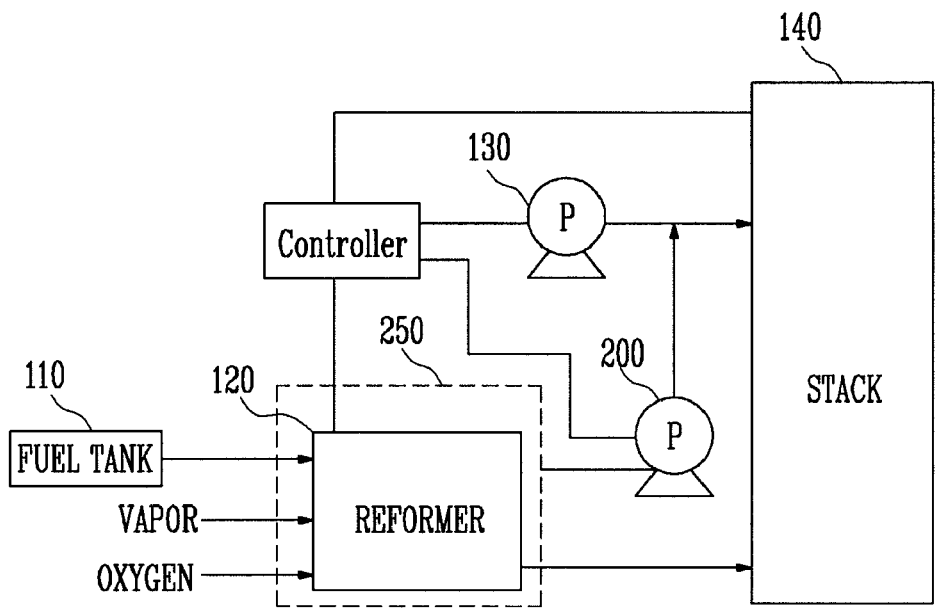
FIG. 2 illustrates a fuel cell system, according to an exemplary embodiment of the present disclosure.

FIG. 2 illustrates a fuel cell system 100, according to aspects of the present invention. The fuel cell system 100 includes a fuel tank 110 to store a fuel; a reformer 120 to convert the fuel into hydrogen; a fuel cell stack 140 to convert the hydrogen into electricity; and a first pump 130; a second pump 200, and a reformer chamber 250. The reformer chamber 250 encloses the reformer 120, to contain the air heated by the reformer 120. The reformer chamber 250 may be formed of a highly insulating material. The second pump 200 supplies air heated by the reformer 120 to the stack 140, to preheat the stack 140 to a predetermined temperature, such as an operating temperature. The second pump 200 is generally connected to the reformer chamber 250 by a pipe. Thus, it is possible to directly preheat the inside of the stack 140, by supplying the heated air to cathodes of the stack 140.

In particular, the reformer chamber 250 captures heat from the reformer 120 that would otherwise be wasted, by containing air heated by the reformer 120. By supplying the heated air to cathodes of the stack 140, it is possible to preheat the stack 140 using heat recycled from the reformer 120. In addition, the heated air can be supplied to the stack 140, after the stack 140 has stopped operating, in order to remove excess water from the stack 140. Accordingly, the stack 140 can be protected from damage resulting from storage in low temperature conditions.

The fuel cell system 100 may further include a controller 105 to control the reformer 120, first pump 130, the stack 140, and the second pump 200. The controller 105 operates the reformer 120 and the second pump 200, until the stack 140 reaches a predetermined temperature, i.e., is preheated. Once the stack 140 is preheated, the controller 105 stops the second pump 200 and operates the stack 140 and the first pump 130. In addition, the controller 105 may operate the reformer 120 until the reformer chamber 250 reaches a certain temperature, prior to operating the second pump 200.

Figure 3:
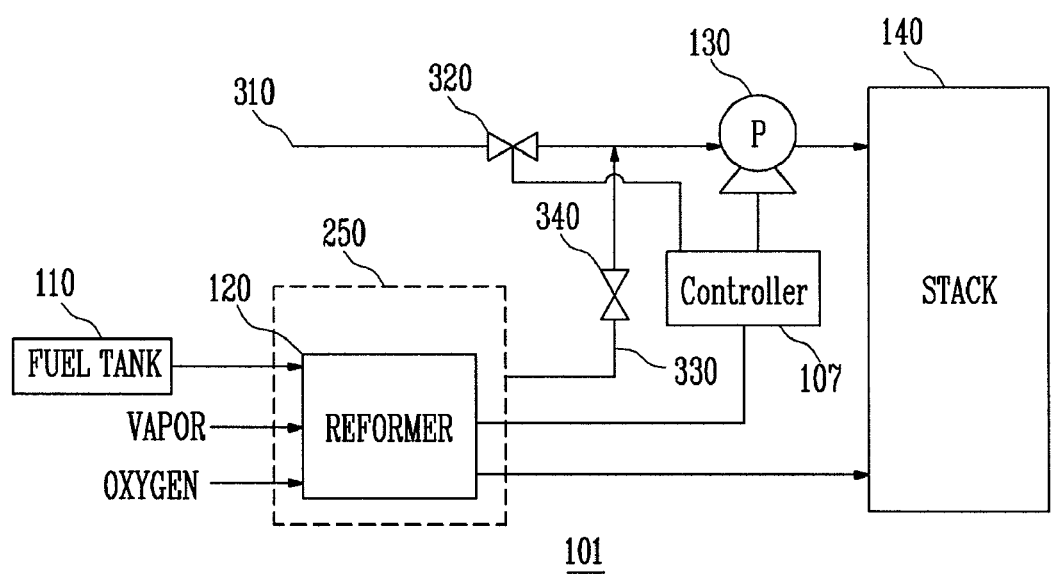
FIG. 3 illustrates a fuel cell system, according to an exemplary embodiment of the present disclosure.

FIG. 3 illustrates a fuel cell system 101, according to another exemplary embodiment of the present disclosure. The system 101 is similar to the system 100, so only the differences therebetween will be described in detail.

Referring to FIG. 3, the system 101 includes a reformer 120, a reformer chamber 250, a first pipe 310, a second pipe 330, a first pump 130, a first valve 320, and a second valve 340. However, unlike the system 100, the system 101 does not include the second pump 200.

The first pipe 310 connects the stack 140 to an oxidant supply, such as external air. The first pump 130 is disposed on the first pipe, to pump fluids there through, to the stack 140. In particular, the first pump 130 supplies both the oxidant and heated air from the chamber 250, to the stack 140. The first valve 320 controls the flow of the oxidant through the first pipe 310 and is disposed upstream from the first pump 130.

The second pipe 330 connects the chamber 250 to the first pipe 310, between the first valve 320 and the first pump 130. The second valve 340 controls the flow of the heated air through the second pipe 330, such that the heated air may be supplied into the first pump 130. The second valve 340 can be closed to prevent the oxidant from flowing into the reformer 120, and the heated air from flowing into the stack 140. The first valve 320 can be closed to prevent the heated air from flowing out of the system 101 and the oxidant from flowing into the stack 140.

Before operating the stack 140 and when the stack 140 is at a temperature below an operating temperature, the first valve 320 is closed to prevent the oxidant from flowing through the first pipe 310, and the second valve 340 is opened, such that the air heated by the reformer 120 is supplied through the second pipe 330, to the first pump 130, and into the stack 140. After the stack 140 is preheated, the first valve 320 may be opened, such that the oxidant flows through the first pipe 310 to the stack 140, and the second valve is closed to block the air heated by the reformer 120 from entering the stack 140. As such, the system 101 can be operated using only the pump 130.

The fuel cell system 101 may further include a controller 107 to control the first valve 320, the second valve 340, the first pump 130, the reformer 120, and the stack 140. The controller 107 may control the system 101 during the preheating and operation of stack 140, such that heated air from the reformer chamber 250 is supplied to the stack 140, to preheat the stack 140. For example, the controller 107 operates the reformer 120 and the first pump 130, to preheat the stack 140, and closes the first valve 320 such that the oxidant is not supplied to the stack 140 while it is being preheated, i.e., prior to operating the stack 140.

After completing the preheating of the stack 140, the first valve 320 may be opened, such that the oxidant is supplied, and the second valve 340 may be closed, to block the flow of the heated air. In addition, the controller 107 can control the operation of the first pump 130, depending on the temperature of the heated air in the reformer chamber 350. For example, the controller 107 operates the first pump 130 and opens the second valve 340, after the heated air reaches a predetermined temperature.

Alternatively, the controller 107 opens the first valve 320, closes the second valve 340, and operates the stack 140, when the temperature of the stack 140 reaches a predetermined temperature, such as an operating temperature. The controller 107 controls the reformer 120, such that the hydrogen is supplied to the stack 140, when the stack 140 is operated.

Although a few exemplary embodiments of the present invention have been shown and described, it would be appreciated by those skilled in the art that changes may be made in these exemplary embodiments, without departing from the principles and spirit of the invention, the scope of which is defined in the claims and their equivalents.

What is claimed is:

1. A fuel cell system comprising:
   a reformer to convert a fuel into hydrogen;
   a fuel cell stack to convert the hydrogen into electricity;
   a reformer chamber to contain air heated by the reformer;
   a first pipe to connect the stack to an oxidant source;
   a pump disposed on the first pipe;
   a first valve disposed on the first pipe, upstream of the pump, to control an amount of the oxidant that is supplied to the pump;
   a second pipe to connect the reformer to the first pipe, between the first valve and the pump; and
   a second valve disposed on the second pipe, to control an amount of the heated air that is supplied to the pump.

2. The system of claim 1, further comprising a controller to control the system, such that the heated air is provided to the stack to preheat the stack, prior to the stack being operated.

3. The system of claim 2, wherein once the stack is preheated, the controller opens the first valve, closes the second valve, and operates the stack.

4. The system of claim 2, wherein the controller closes the first valve, opens the second valve, and turns on the pump, to preheat the stack.

5. The system of claim 4, wherein the controller turns on the pump and opens the second valve, only after the heated air in the reformer chamber reaches a predetermined temperature.

6. The system of claim 5, wherein the controller controls the first valve, such that the first pipe is closed to block the flow of the oxidant, while the stack is preheated.

7. The system of claim 4, wherein once the stack is preheated, the controller opens the first valve, closes the second valve, and operates the stack.

8. The system of claim 1, wherein the reformer chamber comprises a heat insulating material.

* * * * *